(12) United States Patent
Davis et al.

(10) Patent No.: US 10,455,904 B2
(45) Date of Patent: Oct. 29, 2019

(54) SAFETY BUCKLE FOR A CHILD SEAT

(71) Applicants: Melinda Davis, Lake Elsinore, CA (US); David Boobar, Lake Elsinore, CA (US)

(72) Inventors: Melinda Davis, Lake Elsinore, CA (US); David Boobar, Lake Elsinore, CA (US)

( * ) Notice: Subject to any disclaimer, the term of this patent is extended or adjusted under 35 U.S.C. 154(b) by 51 days.

(21) Appl. No.: 15/927,748

(22) Filed: Mar. 21, 2018

(65) Prior Publication Data
US 2018/0279724 A1 Oct. 4, 2018

Related U.S. Application Data

(60) Provisional application No. 62/480,929, filed on Apr. 3, 2017.

(51) Int. Cl.
*A44B 11/25* (2006.01)
*B60N 2/28* (2006.01)

(52) U.S. Cl.
CPC ....... *A44B 11/2573* (2013.01); *A44B 11/2511* (2013.01); *A44B 11/2534* (2013.01); *A44B 11/2549* (2013.01); *B60N 2/2812* (2013.01); *A44B 11/2561* (2013.01); *B60N 2002/2815* (2013.01)

(58) Field of Classification Search
CPC ............ A44B 11/2573; A44B 11/2549; A44B 11/2534; A44B 11/2511; A44B 11/2561; A44B 11/266; B60N 2/2812; B60N 2002/2815; Y10T 24/45623; Y10T 24/45084; Y10T 24/45581; Y10T 24/45529; Y10T 24/45534
See application file for complete search history.

(56) References Cited

U.S. PATENT DOCUMENTS

| | | | |
|---|---|---|---|
| 4,457,052 A | 7/1984 | Hauber | |
| 4,624,033 A | 11/1986 | Orton | |
| 4,675,956 A | 6/1987 | Cohen | |
| 4,757,579 A | 7/1988 | Nishino et al. | |
| 4,793,032 A * | 12/1988 | Crowle | A44B 11/266 24/607 |
| 4,912,950 A * | 4/1990 | Crowle | A44B 11/266 24/167 |
| 4,955,115 A | 9/1990 | Tanaka | |
| 5,184,376 A | 2/1993 | Hunter et al. | |
| 5,205,023 A | 4/1993 | Hunter et al. | |

(Continued)

*Primary Examiner* — Robert Sandy
*Assistant Examiner* — Rowland Do
(74) *Attorney, Agent, or Firm* — Kirk A. Buhler; Buhler & Associates Patenting

(57) ABSTRACT

A seat buckle that accommodates different types and styles of child seats. The standard platform can be used across a variety of baby to child seats. The belt has a button on the front, with a safety mechanism on the back that must be articulated to enable activation of the belt buckle. The buckle may take the configuration of an adapter allows a parent to install the safety buckle for a child seat. Adapter on a pre-existing seat. The belt ideally configured for a "Y" style buckle where straps extend over each shoulder and a single strap passes between the legs of the child. This allows the safety to pass or be blocked between the two belt buckle components of the shoulder straps. This also accommodates most of the buckles that are being produced.

18 Claims, 4 Drawing Sheets

(56) References Cited

U.S. PATENT DOCUMENTS

Figure 1:
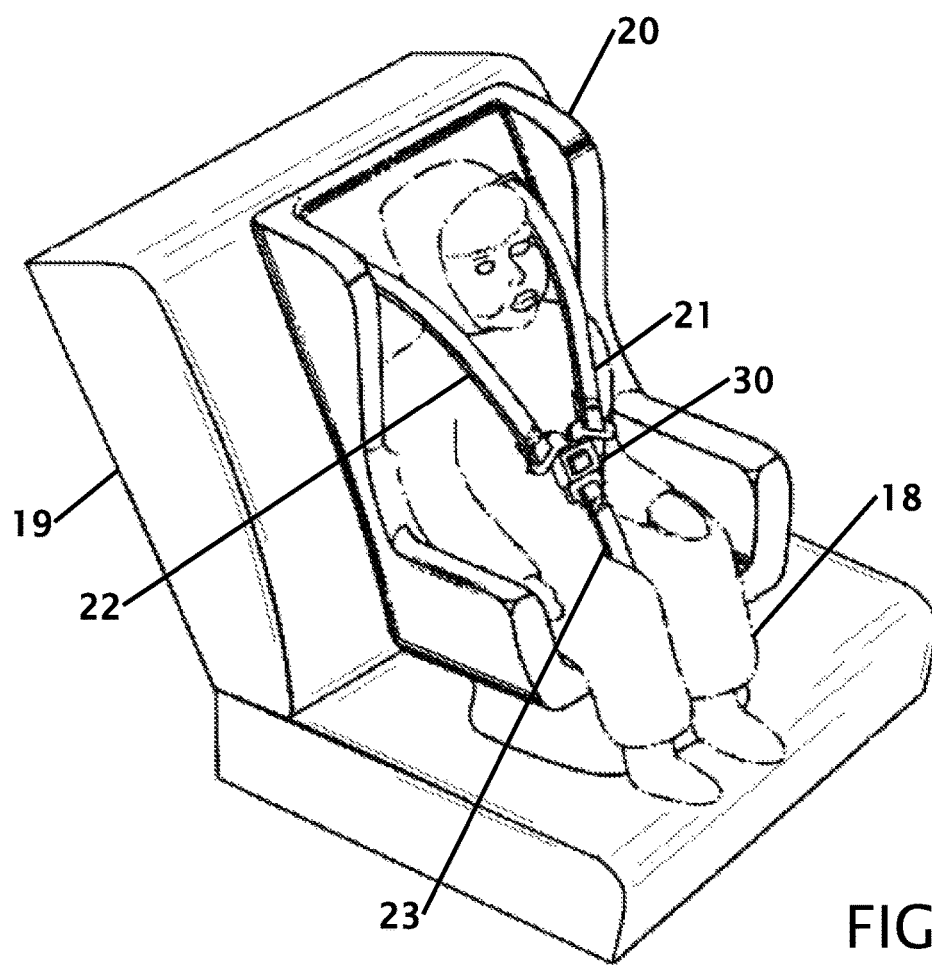

| | | | |
|---|---|---|---|
| 5,311,649 A | 5/1994 | Suh | |
| 5,419,020 A | 5/1995 | Murai | |
| 5,548,879 A | 8/1996 | Wu | |
| 5,907,892 A | 6/1999 | Todd | |
| 6,145,172 A | 11/2000 | Bourdon | |
| 6,163,942 A | 12/2000 | Liao | |
| 6,539,595 B1 * | 4/2003 | Benedict | A44B 11/2542 24/625 |
| 6,560,830 B1 | 5/2003 | Chi | |
| 6,694,578 B1 | 2/2004 | Nicoll | |
| 6,871,517 B2 * | 3/2005 | Bonelli | A44B 11/266 24/166 |
| 7,150,082 B2 | 12/2006 | Beletsky | |
| 7,219,406 B2 | 5/2007 | Chui | |
| 8,176,605 B2 * | 5/2012 | Mok | A44B 11/266 24/613 |
| 8,256,073 B2 * | 9/2012 | Zhang | A44B 11/266 224/161 |
| 8,281,464 B2 | 10/2012 | Shen | |
| 9,521,882 B2 | 12/2016 | Hung | |
| 2004/0112098 A1 | 6/2004 | Bonelli et al. | |
| 2006/0243006 A1 | 11/2006 | Christensen | |
| 2007/0044284 A1 | 3/2007 | Fok | |
| 2009/0100652 A1 | 4/2009 | Mok | |
| 2014/0251725 A1 * | 9/2014 | Schurian | A62B 35/0025 182/3 |

* cited by examiner

SAFETY BUCKLE FOR A CHILD SEAT

CROSS REFERENCE TO RELATED APPLICATIONS

This application is a continuation-in-part of applicant's application Ser. No. 62/480,929 filed Apr. 3, 2017 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a safety buckle for a child seat. More particularly, the present buckle requires multiple actions to take place to release the buckle and allow a child to be removed from the seat.

Description of Related Art Including Information Disclosed Under 37 CFR 1.97 and 1.98

Over the years most locations have required that a child is secured in a baby or child seat until the child reaches a certain age and or weight. The belts have evolved from similar belts that are used on adult seats to belts that utilizes shoulder straps that extend over each shoulder and connect to a single belt that extends between the legs. Depending upon the construction of the belt/seat, the connecting buckle can connect at different locations. Depending upon the location a child may be able to simply press the release button to allow them exit the seat. This may take place with or without the approval of the parent or guardian.

A number of patents and or publications have been made to address these issues. Exemplary examples of patents and or publication that try to address this/these problem(s) are identified and discussed below.

U.S. Pat. No. 4,457,052 issued on Jul. 3, 1984 to Peter Hauber is titled a Buckle for Child's Car Seat Harness. This patent is an improved buckle for a child's safety car seat in which a release plate that normally bears against a center plate, within an enclosure housing, to receive in locking relation hasp tips having an opening cooperating with bosses on the release plate. While this patent is for child seat with dual shoulder belts it only includes a single release button that can be easily activated by a child.

U.S. Pat. No. 4,624,033 issued on Nov. 25, 1986 to Dale W. Orton is titled a Child Safety Seatbelt Securement Device. The device of the invention includes a housing adapted for at least partially covering the release button of a female seatbelt buckle so that direct access to the release button is substantially restricted. In this patent, the button and the release mechanism are both located on the top of the buckle where they can be easily viewed and opening. The release only prevents or allows the button to be depressed, and the invention operates with a single belt and not a dual belt.

U.S. Pat. No. 4,955,115 issued on Sep. 11, 1990 to Kohbun Tamaka is titled Buckle Device. This patent discloses a buckle device in which a lock plate is moved by an urging force to be brought into engagement with a tongue plate or, in the state of engagement with the tongue plate, it is moved against the urging force by the operation of a release button. This patent essentially uses a key or slider that is actuated to allow or block operation of the of the buckle release.

U.S. Pat. No. 5,907,892 issued on Jun. 1, 199 to Maureen Todd is titled Child Safety Apparatus for a Seat Buckle. This patent discloses a latch mechanism that releasably interlocks with a seat belt tongue and further includes a safety apparatus for the latch mechanism. This patent uses a slide lock to allow or prevent activation of the release button. Because this patent uses a sliding mechanism, the slide can be set to either the release or the lock setting where a child can freely open the belt.

What is needed is a safety buckle for a child seat that requires multiple operations to allow the buckle to open. The proposed safety buckle for a child seat provides the solution with a buckle that require operation in both the front and the back of the buckle to allow the buckle to open. The safety buckle for a child seat should also be optimized to operate with a "Y" or five-point type buckle.

BRIEF SUMMARY OF THE INVENTION

It is an object of the safety buckle for a child seat for the buckle to operate with most child seat belts. This allows the belt to be transportable to different types and styles of child seats. It further provides a standard platform for a patent to use across a variety of child seats that support babies and children of different sizes. This important because a seat for a baby can take a different size and configuration as the baby grows to an infant to a toddler to a child.

It is an object of the safety buckle for a child seat to require multiple simultaneous operations to release the buckle. The button on the front of the belt is essentially unchanged, with the addition being a mechanism located on the back of the buckle that must be articulated to enable activation of the belt buckle. The activation can take a variety of types from another button that is depressed to a lever, tab or button that must be displaced by sliding or the like. The displaced tab moves a blocking mechanism that prevents the button from being depressed. A child that simply depresses the visible button can't unlock the buckle. This also makes it difficult for another child to release the belt.

It is another object of the safety buckle for a child seat to be fabricated as an adapter for an existing seat. The adapter allows a parent to install the safety buckle for a child seat. Adapter on a pre-existing seat. This saves the expense of purchasing a completely new child seat. The original child seat buckle can be disabled and the new safety buckle for a child seat can be installed using most or all of the existing hardware to provide the safety disclosed herein.

It is still another object of the safety buckle for a child seat to be configured for a "Y" or five-point safety harness style buckle where straps extend over each shoulder and a single strap passes between the legs of the child. This allows the safety to pass or be blocked between the two belt buckle components of the shoulder straps. This also accommodates most of the buckles that are being produced.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

Figure 2:
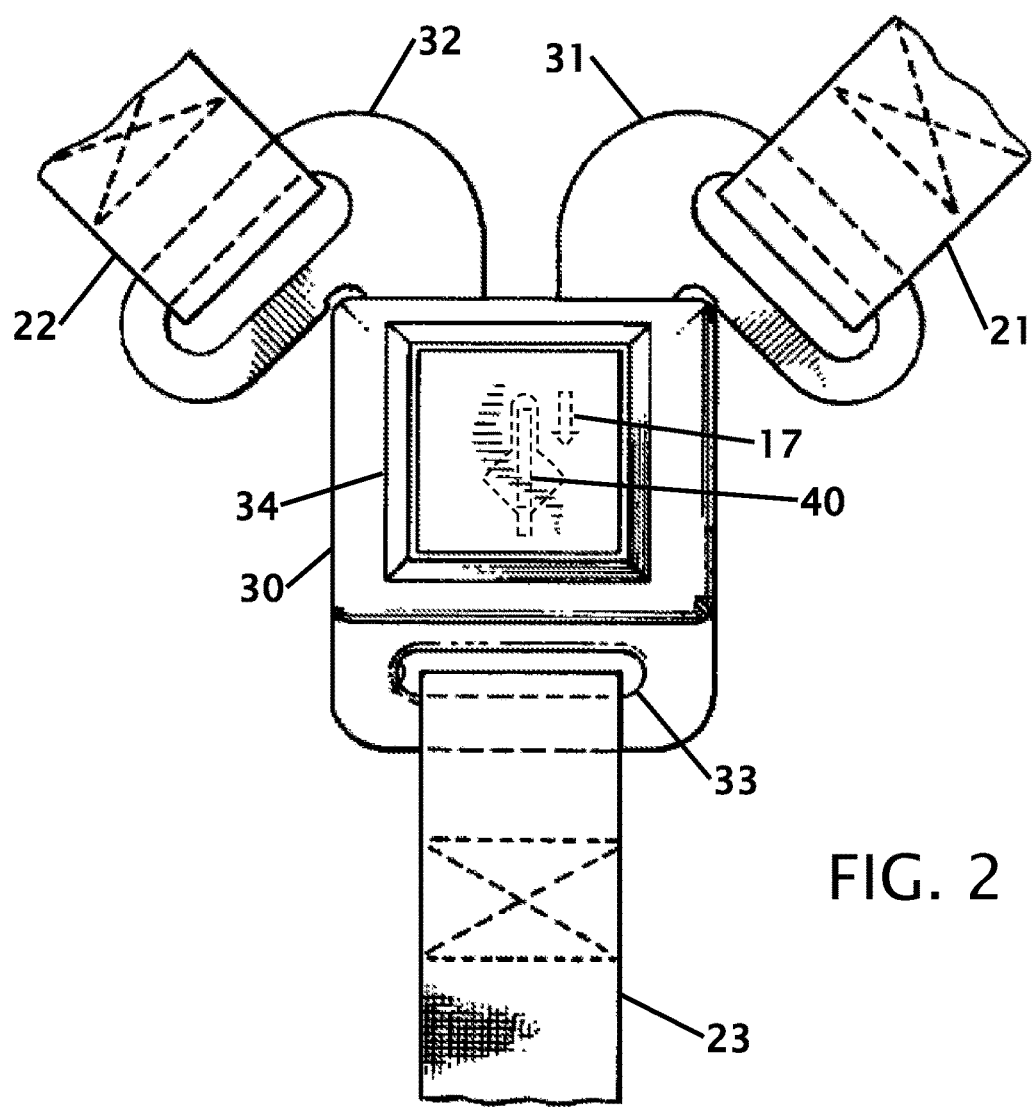
Figure 3:
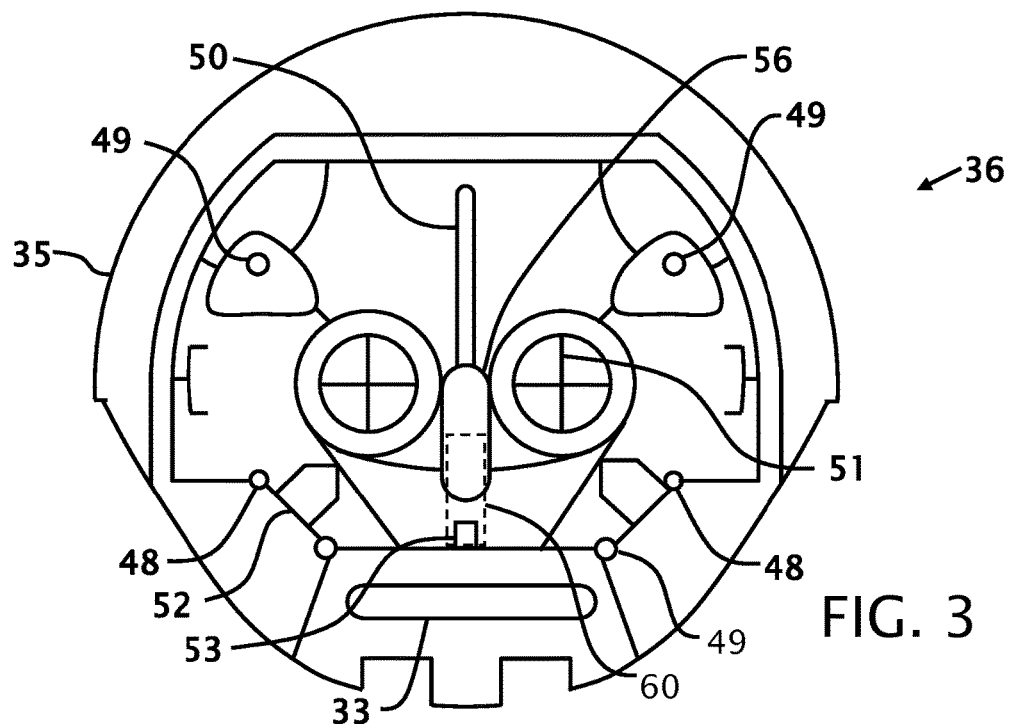
Figure 4:
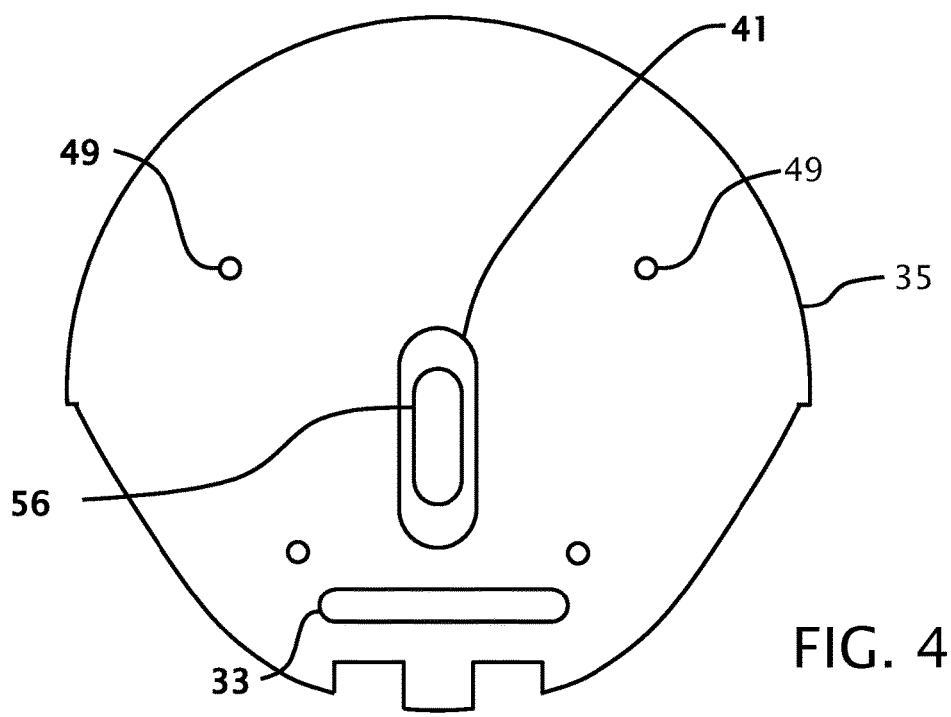
Figures 5A, 5B, 5C, 5D:
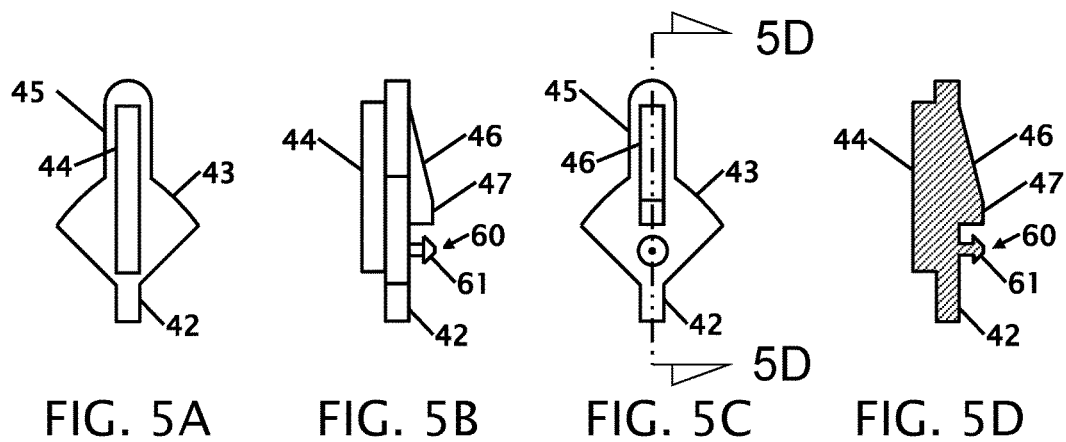
Figures 6A, 6B, 6C:
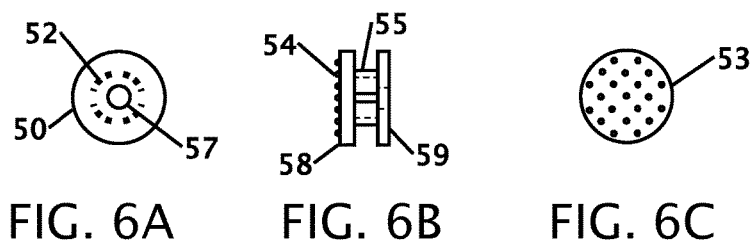
Figures 7, 8:

FIG. 1 shows a perspective view of a child secured in a child seat.
FIG. 2 shows a plan view of a three-point seat buckle.
FIG. 3 is a front view of a buckle mechanism in the preferred embodiment.
FIG. 4 is a back view of a buckle mechanism in the preferred embodiment.
FIG. 5A-5D show images of the wedge release lock.
FIG. 6A-6C show images of the finger pad.
FIG. 7 shows the spring.
FIG. 8 shows the button.

DETAILED DESCRIPTION OF THE INVENTION

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

ITEM NUMBERS AND DESCRIPTION 17 depressed
18 child
19 car seat
20 child seat
21 shoulder strap/second belt
22 shoulder strap/second belt
23 separate strap
30 buckle
31 tongue
32 tongue
33 hole
34 button
35 back plate
36 latch mechanism
40 release lock
41 depressed area
42 post
43 two wings
44 rib
45 ledge
46 tapered
47 flat
48 alignment pins
49 holes
50 slot
51 spring slot
52 bolt hole
pin
54 nubs or protrusions
55 inner wheel surface
56 cut-out clearance area
57 clearance hole
58 outer hub
59 outer hub
60 spring
61 hook
62 rear tab surface FIG. 1 shows a perspective view of a child secured in a child seat 20. This is a typical configuration of a child or baby seat 20 that is secured to a car seat 19. The baby or child seat is secured with the adult seat buckle or with other apparatus. Child or baby seats are configured in a variety of sizes and generally a parent will need to purchase several different seats as the child grows.

This child seat 20 is shown without a front rest for clarity. The child 18 is typically secured with a three-point or "Y" belt where straps 21, 22 extend over each shoulder of the child 18 and join at a buckle 30 and a separate strap 23 extends between the legs of the child 18. To release the child 18 from the seat 20, the central button is pressed to release both shoulder straps 21, 22. A child can simply depress the button on the buckle 30 to release them self from the seat. This is an unsafe condition and the buckle 30 needs some safety or interlock mechanism that prevents a child from pressing the button on the buckle to release the shoulder straps 21, 22.

In the preferred embodiment, the buckle 30 includes a safety located in the back of the buckle that must be manipulated with the button. Configuring the safety behind the belt requires a larger hand to operate both sides of the buckle at the same time to prevent a child with small hands from reaching around both side of the belt housing to simultaneously slide the release and depress the button.

FIG. 2 shows a plan view of a three-point seat buckle. This is one of many contemplated three-point or "Y" belt buckles where a separate strap 23 is secured through hole 33 in this buckle 30. This buckle 30 shows a square or rectangular button 34, but the button can be nearly any shape such as round, oval or others. The hole 33 that secures the fixed belt separate strap 23 has a housing that covers some, most, or all of the metal base where the separate strap 23 is secured. In this embodiment, the removable belts 21 and 22 connect into the housing with metal tongues 31 and 32. The button 34 is depressed to release the metal tongues 31 and 32.

On the back side of the housing is a wedge release lock 40 that must be displaced 17 to allow the button 34 to be depressed. For an adult hand the wedge release lock 40 can be displaced while the button 34 is depressed, but a small hand can't reach around the belt. Further, placing the wedge release lock 40 on the back of the buckle creates an additional level of complexity and manipulation that is not visible from the front of the buckle 30.

FIG. 3 is a front view of a buckle mechanism in the preferred embodiment. This figure shows the back plate 35 with the hole 33 where the fixed strap is secured into the back plate 35. The fixed strap is passed through the hole 33 and is sewn together secure the strap to the buckle. The majority of the fixed components are secured to the back plate 35 with screws, bolts or rivets through holes 49. Alignment pins 48 align the front housing, back housing and the back plate 35. The bolt hole 52 provides a clearance for a fastener that secures the top and bottom housings.

A pin 53 provides a locator for spring that pushes against wedge release lock (not shown in this figure. The wedge release lock is further located to move in a slot 50. The slot 50 maintains orientation and a track for motion of the wedge release lock. A cut-out area 56 provides a clearance for the safety lock switch that also passes through the housing. In the embodiment shown there are two main lock plate spring slots 51 where the locking mechanism for the buckles are located. The spring pushes raised areas through holes in the metal tongues 31 and 32 to prevent the metal tongues from being withdrawn from the housing.

FIG. 4 is a back view of a buckle mechanism in the preferred embodiment. In this view the location of the screws, bolts or rivets through holes 49 is shown. The bottom of the back plate shows the strap hole 33. In the center of the back plate, the cut-out depression area 41 is shown with the clearance 56 for the safety lock switch. The depressed area 41 is approximately half the thickness of button 58 material.

FIG. 5A-5D show top, bottom, side and a cross-section images of the wedge release lock 40. Depending upon the location of the wedge release lock 40 the activation button of the belt can be used to release the tongues. The wedge release lock 40 is configured with two wings 43 that can block the button 34 (not shown in this figure) from pushing the retainers clear of the metal tongues 31, 32 (not shown in this figure) on the buckle. The back side of the wedge release lock 40 has a rib 44 that is guided in the slot 50 of the back plate. A ledge 45 around the rib 44, provides a bearing surface and prevents debris from entering the buckle.

A spring 60 is engaged in the lower portion tab 42 of the wedge release lock 40. The spring keeps the wedge release lock 40 in an elevated (blocking) position in the buckle. On the top of the wedge release lock 40 is a tapered ramp 46 with a flat 47 on the rib with a top flat, and a locking head 60. The sides of the locking head 61 are tapered and engage into a hole in a finger pad that is shown and described in FIG. 6A-6C herein.

FIG. 6A-6C show images of the finger pad. The finger pad is configured as an inner wheel surface 55 with two outer hubs 58 and 59. The finger pad provides a frictional top surface of outer hub 58 with a plurality of nubs 54 or other protrusions to provide a grip surface for a finger. It is also contemplated that the protrusions 54 can be ribs or a saw-tooth surface to improve grip of a finger on the finger pad. While the finger pad is shown in a round configuration, other shapes and sizes are contemplated that would accomplish the same result.

One side of the finger pad has a clearance hole 57. The clearance hole allows the hook 61 shown in FIG. 5B to engage and prevent the finger pad from separating from the wedge release lock. The rear surface of outer hub 58 can be elevated from the back of the buckle or can be slightly depressed depending upon the desired "feel" or the comfort of the user then the belt is secured to a child.

FIG. 7 shows the spring 60. The spring is engaged on one side on the pin 53 shown in FIG. 3 and on the opposing side in the post 42 shown in FIG. 5A-5D. The spring maintains the wedge release lock 40 in the desired position to prevent the front activation button 34 shown in FIG. 2 from being depressed unless the spring force is overcome.

FIG. 8 shows the button. The button has a top rounded surface 61 and a rear tab surface 62 that secures the button in the assembly.

Thus, specific embodiments of a safety buckle for a child seat have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A safety buckle for a child seat comprising:
   a housing;
   said housing having a fixedly secured first belt;
   said housing having a latch mechanism having a securing mechanism for at least a second belt that releasably interlocks with a seat belt tongue;
   said latch mechanism including a pushbutton located on a front of said housing, said pushbutton being manually movable from a rest position to a release position to cause said latch mechanism to release said seat belt tongue from an interlocked engagement with said latch mechanism;
   a safety apparatus comprising a wedge release lock located on a back of said housing such that said wedge release lock is not visible when said button is viewed;
   said wedge release lock has a normal position that is retained by a spring whereby in said normal position said pushbutton is prevented from releasing said latch mechanism;
   said retaining forces from said spring must be overcome to displace said wedge release lock from said normal position to allow release of said seat belt tongue;
   said displacement is with linear movement of said wedge release lock, and
   said linear movement is perpendicular with movement of said pushbutton.

2. The safety buckle for a child seat according to claim 1, includes a third belt.

3. The safety buckle for a child seat according to claim 2, wherein said belts are configured in a three-point or a "Y" configuration.

4. The safety buckle for a child seat according to claim 2, wherein said wedge release lock exists between said at least a second belt and said third belt.

5. The safety buckle for a child seat according to claim 4, wherein said wedge release lock requires clearance from between both said second belt and said third belt to allow said second belt and said third belt to be released from said housing.

6. The safety buckle for a child seat according to claim 1, wherein said linear movement is parallel with a front face of said housing.

7. The safety buckle for a child seat according to claim 1, wherein said wedge release lock slides in a retaining slot.

8. The safety buckle for a child seat according to claim 7, wherein said wedge release lock has two wings on opposing sides of a rib.

9. The safety buckle for a child seat according to claim 8, wherein said rib is slidably engaged in said retaining slot.

10. The safety buckle for a child seat according to claim 9, wherein said wedge release lock further includes a hook.

11. The safety buckle for a child seat according to claim 10, wherein said hook is configured to accept a pin.

12. The safety buckle for a child seat according to claim 11, wherein said pin extends outside of said housing.

13. The safety buckle for a child seat according to claim 12, wherein said pin is moved to operate said wedge release lock.

14. The safety buckle for a child seat according to claim 1, wherein said seat belt tongue is retained by said spring against said pushbutton.

15. The safety buckle for a child seat according to claim 1, wherein said wedge release lock has a taper.

16. The safety buckle for a child seat according to claim 1, wherein said wedge release lock has at least one wing.

17. The safety buckle for a child seat according to claim 1, wherein said safety buckle is configured to secure a child in a seat.

18. The safety buckle for a child seat according to claim 1, wherein said safety buckle require manipulation of a sliding motion on one side of said housing and a perpendicular depression on an opposing side of said housing.

* * * * *